US011978384B2

(12) United States Patent
Zhang

(10) Patent No.: US 11,978,384 B2
(45) Date of Patent: May 7, 2024

(54) DISPLAY METHOD FOR ELECTRONIC DEVICE AND ELECTRONIC DEVICE

(71) Applicant: Huawei Technologies Co., Ltd., Shenzhen (CN)

(72) Inventor: Xiufeng Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 110 days.

(21) Appl. No.: 17/760,672

(22) PCT Filed: Sep. 17, 2020

(86) PCT No.: PCT/CN2020/115860
§ 371 (c)(1),
(2) Date: Mar. 15, 2022

(87) PCT Pub. No.: WO2021/052408
PCT Pub. Date: Mar. 25, 2021

(65) Prior Publication Data
US 2022/0392394 A1 Dec. 8, 2022

(30) Foreign Application Priority Data
Sep. 18, 2019 (CN) ......................... 201910883068.1

(51) Int. Cl.
*G09G 3/20* (2006.01)

(52) U.S. Cl.
CPC ... *G09G 3/2096* (2013.01); *G09G 2320/0666* (2013.01); *G09G 2340/12* (2013.01)

(58) Field of Classification Search
CPC ......... G09G 3/2096; G09G 2320/0666; G09G 2340/12
See application file for complete search history.

(56) References Cited

U.S. PATENT DOCUMENTS 10,257,487 B1 4/2019 Tamatam et al.
2010/0289819 A1* 11/2010 Singh ....................... G09G 5/14 345/619
(Continued)

FOREIGN PATENT DOCUMENTS

CN 103425452 A 12/2013
CN 105373363 A 3/2016
(Continued)

OTHER PUBLICATIONS

Texas Instruments, "OMAP35x Applications Processor Technical Reference Manual" Technical Reference Manual, Literature No. SPRUF98Y, Apr. 2010, XP055601641, 3492 pages.

*Primary Examiner* — Antonio A Caschera
(74) *Attorney, Agent, or Firm* — Conley Rose, P.C.

(57) ABSTRACT

A display method for an electronic device including a first display area and a second display area. In the method, the electronic device determines a first application mode, adjusts, based on the first application mode, intensity values of color channels, stored in a hardware composer (HWC), determines, using the HWC, each first layer corresponding to the first display area, and overlays, using the HWC, the first layer and a background color layer corresponding to adjusted intensity values of the color channels. In an overlay process, the background color layer is located below the first layer, and the background color layer corresponds to the second display area. Then, the display is used to display an overlaid image.

20 Claims, 7 Drawing Sheets

(56) References Cited

U.S. PATENT DOCUMENTS

| | | | | |
|---|---|---|---|---|
| 2016/0025977 | A1 | 1/2016 | Osterhout | |
| 2016/0155427 | A1 | 6/2016 | Hu et al. | |
| 2016/0284279 | A1* | 9/2016 | Li | G09G 3/3406 |
| 2017/0124963 | A1 | 5/2017 | Lu | |
| 2018/0122038 | A1* | 5/2018 | Wang | G06T 11/00 |
| 2019/0025900 | A1 | 1/2019 | Azam et al. | |
| 2019/0221176 | A1 | 7/2019 | Emslie | |
| 2020/0286446 | A1* | 9/2020 | Liu | G09G 3/3413 |

FOREIGN PATENT DOCUMENTS

| | | | |
|---|---|---|---|
| CN | 109165013 | A | 1/2019 |
| CN | 109542376 | A | 3/2019 |
| CN | 110187858 | A | 8/2019 |
| TW | 201710846 | A | 3/2017 |

* cited by examiner

DISPLAY METHOD FOR ELECTRONIC DEVICE AND ELECTRONIC DEVICE

CROSS-REFERENCE TO RELATED APPLICATIONS

This is a U.S. National Stage of International Patent Application No. PCT/CN2020/115860 filed on Sep. 17, 2020, which claims priority to Chinese Patent Application No. 201910883068.1 filed on Sep. 18, 2019. Both of the aforementioned applications are hereby incorporated by reference in their entireties.

TECHNICAL FIELD

This application relates to the field of electronic device technologies, and in particular, to a display method for an electronic device and an electronic device.

BACKGROUND

With development of technologies, a plurality of types of electronic devices appear currently to meet diversified requirements of users. A display of an electronic device includes at least two display areas, to display different content in different display areas.

For example, the display of the electronic device may be a curved screen, and the curved screen includes a first display area with a relatively small curvature and a second display area with a relatively large curvature. Referring to FIG. 1(*a*) and FIG. 1(*b*), the second display area 20 may be disposed on an upper side and a lower side of the first display area 10 or on a left side and a right side of the first display area 10. Alternatively, as shown in FIG. 1(*c*), the second display area 20 may be disposed on four sides of the first display area 10. The curvature of the first display area is relatively small. Therefore, the first display area is usually used to display an image to be displayed by the electronic device. The curvature of the second display area is relatively large. In order to avoid displaying a distorted image, the second display area is usually used as a touch area to display a touch key, an icon, or the like, or used to prompt information such as a missed call.

To obtain an image that needs to be displayed on the display, the following two methods may be used in the conventional technology. A hardware composer (hardware composer, HWC) is disposed in the electronic device. In a first method, each display area is divided into a plurality of layers. The HWC is used to generate each layer corresponding to each display area, perform overlay processing on the layers to obtain an overlaid image, and then push the overlaid image to the display, so that the display displays the overlaid image. The overlaid image is the image that needs to be displayed on the display.

In a second method, a graphics processing unit (graphics processing unit, GPU) is required. The GPU is configured to obtain, by using a memory, each layer corresponding to each display area, perform overlay processing on the layers to obtain an overlaid image, and then transmit the overlaid image to the memory. The memory then pushes, by using the HWC, the overlaid image to the display, so that the display displays the image.

However, in a research process of this application, the inventor finds that a quantity of layers that can be generated by using the HWC is limited in the first method. When there are a relatively large quantity of layers corresponding to each display area, the HWC cannot determine the layers. As a result, the image that needs to be displayed on the display cannot be determined. In the second method, the GPU needs to obtain the layers from the memory, and transmit the overlaid image to the memory. Therefore, the GPU needs to exchange data with the memory for a plurality of times. As a result, power consumption is relatively high.

SUMMARY

In the conventional technology, when an HWC is used to determine an image to be displayed on a display, the image that needs to be displayed on the display sometimes cannot be determined due to a limitation of the HWC. When a GPU is used to determine the image to be displayed on the display, there is usually relatively high power consumption. To resolve the foregoing technical problems, embodiments of this application disclose a display method for an electronic device and an electronic device.

According to a first aspect, an embodiment of this application provides a display method for an electronic device. A display of the electronic device includes a first display area and a second display area. The method includes:

The electronic device determines a first application mode.

The electronic device adjusts, based on the first application mode, intensity values of color channels, stored in a hardware composer HWC that is disposed in the electronic device.

The electronic device determines, based on the HWC, each first layer corresponding to the first display area.

The electronic device overlays, by using the HWC, the first layer and a background color layer corresponding to adjusted intensity values of the color channels. In an overlay process, the background color layer is located below the first layer, and the background color layer is a layer corresponding to the second display area.

The electronic device displays an overlaid image on the display.

According to the method, the HWC does not need to generate all layers. This reduces a quantity of layers generated by the HWC, and avoids a problem that the image that needs to be displayed on the display cannot be determined due to a limitation of the HWC. In addition, a GPU does not need to exchange data with a memory for a plurality of times. Power consumption is reduced.

In a possible design, that the electronic device adjusts, based on the first application mode, intensity values of color channels, stored in a hardware composer HWC that is disposed in the electronic device includes:

When the first application mode indicates that a battery level of the electronic device is greater than a first threshold, the electronic device adjusts, based on an adjustment interval and a variation that correspond to each color channel, the intensity values of the color channels, stored in the HWC.

A difference between an adjusted intensity value of the color channel and an unadjusted intensity value of the color channel is the variation.

When the battery level of the electronic device is greater than the first threshold, it indicates that the battery level of the electronic device is sufficient. In this case, the second display area may display different colors at each adjustment period interval.

In a possible design, that the electronic device adjusts, based on the first application mode, intensity values of color channels, stored in a hardware composer HWC that is disposed in the electronic device includes:

When the first application mode indicates that the electronic device receives a communication message, and the communication message is not viewed, the electronic device determines an adjustment period. The adjustment period includes at least two time periods.

The electronic device periodically adjusts, based on intensity values of the color channels, corresponding to each time period the intensity values of the color channels, stored in the HWC.

When the first application mode indicates that the communication message is viewed, the electronic device adjusts the intensity values of the color channels, stored in the HWC to an initial value. The initial value is an intensity value of the color channel stored in the HWC before the electronic device receives the communication message.

According to the foregoing steps, an image in the second display area can change periodically. In addition, images in the second display area are different in different time periods in each adjustment period, to implement message prompting.

In a possible design, that the electronic device adjusts, based on the first application mode, intensity values of color channels, stored in a hardware composer HWC that is disposed in the electronic device includes:

When the first application mode indicates that the electronic device plays audio, the electronic device obtains a frequency and/or an amplitude of the audio.

The electronic device adjusts, based on a correspondence between the frequency of the audio and a first color channel, an intensity value of the first color channel stored in the HWC, and/or the electronic device adjusts, based on a correspondence between the amplitude of the audio and a second color channel, an intensity value of the second color channel stored in the HWC.

According to the method, the second display area of the electronic device can present different colors based on the played audio.

In a possible design, that the electronic device adjusts, based on the first application mode, intensity values of color channels, stored in a hardware composer HWC that is disposed in the electronic device includes:

When the first application mode indicates that the electronic device performs a photographing operation, the intensity values of the color channels stored in the HWC are adjusted to a first intensity value.

The first intensity value may be an intensity value of the color channel in a highlight case, so that when the electronic device performs the photographing operation, the second display area can present a highlighted color, to play a role of light compensation.

In an optional design, the HWC includes a register.

When pixels in the second display area display a same color, the register is configured to store an intensity value of each color channel.

When different areas in the second display area display different colors, the register is configured to store intensity values of each color channel corresponding to the different areas.

According to a second aspect, an embodiment of this application provides an electronic device, including a processor, a hardware composer HWC, and a display.

The display includes a first display area and a second display area.

The processor is configured to determine a first application mode, and adjust, based on the first application mode, intensity values of color channels, stored in the hardware composer HWC that is disposed in the electronic device.

The HWC is configured to determine each first layer corresponding to the first display area, and overlay the first layer and a background color layer corresponding to adjusted intensity values of the color channels. In an overlay process, the background color layer is located below the first layer, and the background color layer is a layer corresponding to the second display area.

The display is configured to display an overlaid image.

In a possible design, that the processor adjusts, based on the first application mode, the intensity values of the color channels, stored in the hardware composer HWC that is disposed in the electronic device includes:

When the first application mode indicates that a battery level of the electronic device is greater than a first threshold, the processor adjusts, based on an adjustment interval and a variation that correspond to each color channel, the intensity values of the color channels, stored in the HWC.

A difference between an adjusted intensity value of the color channel and an unadjusted intensity value of the color channel is the variation.

In a possible design, that the processor adjusts, based on the first application mode, the intensity values of the color channels, stored in the hardware composer HWC that is disposed in the electronic device includes:

When the first application mode indicates that the electronic device receives a communication message, and the communication message is not viewed, the processor determines an adjustment period. The adjustment period includes at least two time periods.

The processor periodically adjusts, based on intensity values of the color channels, corresponding to each time period, the intensity values of the color channels, stored in the HWC.

When the first application mode indicates that the communication message is viewed, the processor adjusts the intensity values of the color channels, stored in the HWC to an initial value. The initial value is an intensity value of the color channel stored in the HWC before the electronic device receives the communication message.

In a possible design, that the processor adjusts, based on the first application mode, the intensity values of the color channels, stored in the hardware composer HWC that is disposed in the electronic device includes:

When the first application mode indicates that the electronic device plays audio, the processor obtains a frequency and/or an amplitude of the audio.

The processor adjusts, based on a correspondence between the frequency of the audio and a first color channel, an intensity value of the first color channel stored in the HWC, and/or the electronic device adjusts, based on a correspondence between the amplitude of the audio and a second color channel, an intensity value of the second color channel stored in the HWC.

In a possible design, that the processor adjusts, based on the first application mode, the intensity values of the color channels, stored in the hardware composer HWC that is disposed in the electronic device includes:

When the first application mode indicates that the electronic device performs a photographing operation, the processor adjusts the intensity values of the color channels, stored in the HWC to a first intensity value.

In an optional design, the HWC includes a register.

When pixels in the second display area display a same color, the register is configured to store an intensity value of each color channel.

When different areas in the second display area display different colors, the register is configured to store intensity values of each color channel corresponding to the different areas.

According to a third aspect, an embodiment of this application provides a computer-readable storage medium that stores instructions. When the instructions are run on a computer, the computer is enabled to perform the method according to the first aspect.

According to a fourth aspect, an embodiment of this application provides a computer program product including an instruction. When the computer program product runs on an electronic device, the electronic device is enabled to perform the method according to the first aspect.

Compared with that in a first method in the conventional technology, in the method in the embodiments of this application, the first layer corresponding to the first display area is determined by using the HWC, and the background color layer is determined by adjusting the intensity values of the color channels, stored in the HWC. The HWC does not need to generate all layers. Therefore, this reduces a quantity of layers generated by the HWC is reduced, and avoids the problem that the image that needs to be displayed on the display cannot be determined due to the limitation of the HWC. In addition, compared with that in a second method in the conventional technology, the GPU does not need to exchange data with a memory for a plurality of times. The power consumption is reduced.

BRIEF DESCRIPTION OF DRAWINGS

To describe the technical solutions in this application more clearly, the following briefly describes the accompanying drawings for describing the embodiments. Apparently, a person of ordinary skill in the art may derive other drawings from these accompanying drawings without creative efforts.

FIG. 1(*b*) is a schematic diagram of a display of another electronic device according to the conventional technology;

FIG. 1(*c*) is a schematic diagram of a display of still another electronic device according to the conventional technology;

FIG. 5(*b*) is a schematic diagram of another background color layer and first layers according to an embodiment of this application;

DESCRIPTION OF EMBODIMENTS

In the specification, claims, and accompanying drawings of this application, the terms "first", "second", "third" and the like are intended to distinguish different objects but do not limit a particular sequence.

In the embodiments of this application, the word "example" or "for example" is used to represent giving an example, an illustration, or a description. Any embodiment or design scheme described as the word "example" or "for example" in the embodiments of this application should not be explained as being more preferred or having more advantages than another embodiment or design scheme. Exactly, use of the term such as "example" or "for example" is intended to present a relative concept in a specific manner.

In the conventional technology, when an HWC is used to determine an image to be displayed on a display, the image that needs to be displayed on the display sometimes cannot be determined due to a limitation of the HWC. When a GPU is used to determine the image to be displayed on the display, there is usually relatively high power consumption. To resolve the foregoing technical problems, embodiments of this application disclose a display method for an electronic device and an apparatus.

Figure 2:
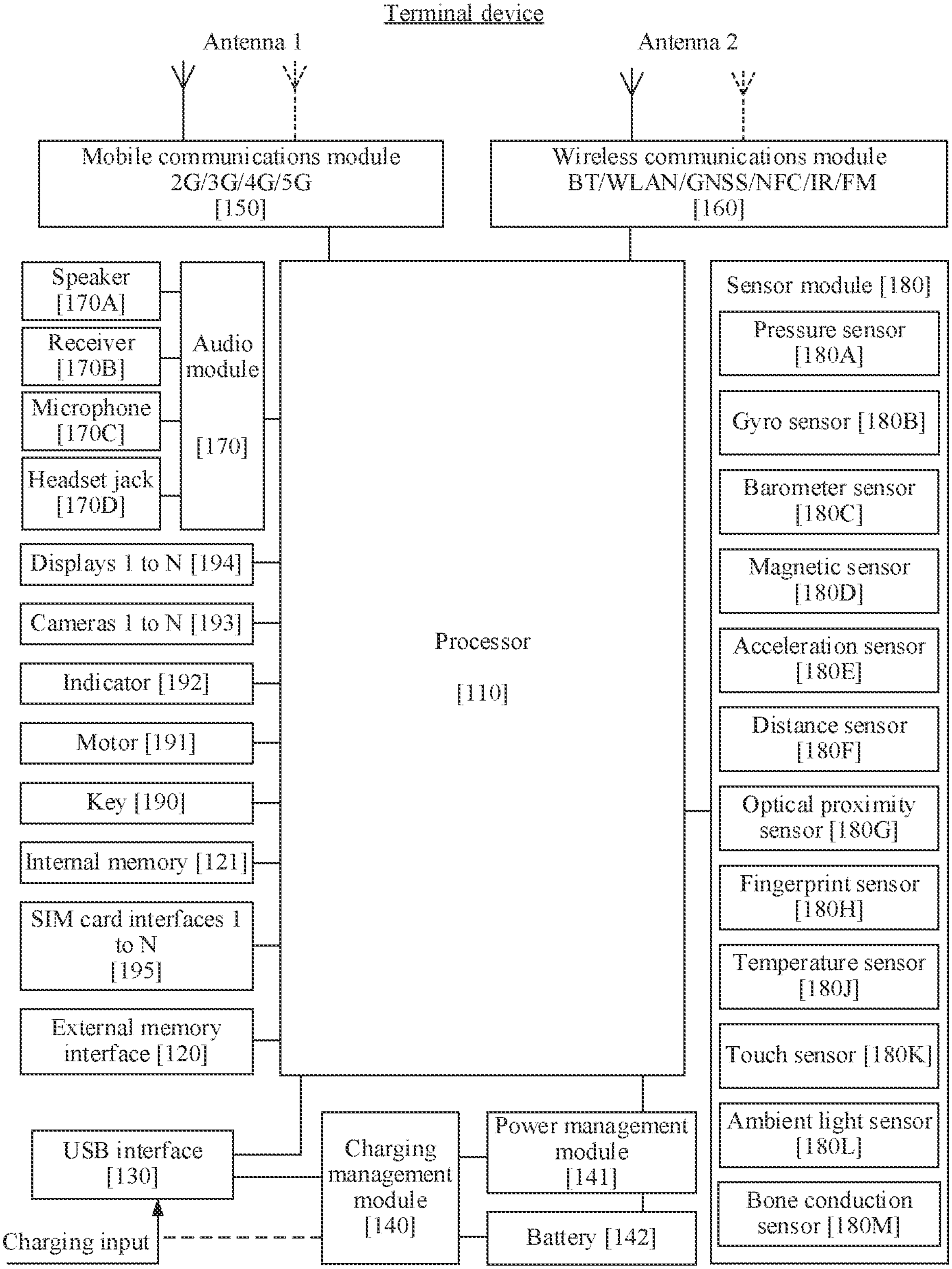
FIG. 2 is a schematic diagram of a structure of an electronic device according to an embodiment of this application.

Solutions disclosed in the embodiments of this application may be applicable to an electronic device. The electronic device may be a device such as a mobile phone, a tablet computer, or a smart wearable device. In an example, a structure of the electronic device may be shown in FIG. 2. FIG. 2 is a schematic diagram of a structure of an electronic device to which an electronic device operation method provided in an embodiment of this application is applicable. As shown in FIG. 2, the electronic device may include a processor 110, an external memory interface 120, an internal memory 121, a universal serial bus (universal serial bus, USB) interface 130, a charging management module 140, a power management module 141, a battery 142, a sensor module 180, a key 190, a motor 191, an indicator 192, a camera 193, a display 194, and the like. In this embodiment of this application, the display 194 is a curved screen. The sensor module 180 may include a pressure sensor 180A, a gyro sensor 180B, a barometric pressure sensor 1800, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a hone conduction sensor 180M, and the like. Further, when the electronic device is a mobile phone, the electronic device may further include: an antenna 1, an antenna 2, a mobile communications module 150 a wireless communications module 160, an audio module 170, a speaker 170A, a receiver 170B, a microphone 170C, a headset jack 170D, a subscriber identity module (subscriber identification module, SIM) card interface 195, and the like.

It may be understood that the structure shown in this embodiment does not constitute a specific limitation on the electronic device. In some other embodiments, the electronic device may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, and a video codec, a digital signal processor (digital signal processor, DSP), a baseband processor, a neural-network processing unit (neural-network processing unit, NPU), and/or the like.

Different processing units may be independent components, or may be integrated into one or more processors.

The controller may be a nerve center and a command center of the electronic device. The controller may generate an operation control signal based on instruction operation code and a time sequence signal, to complete control of instruction reading and instruction execution.

A memory may further be disposed in the processor 110, and is configured to store instructions and data. In some embodiments, a memory in the processor 110 is a cache memory. The memory may store instructions or data just used or cyclically used by the processor 110. If the processor 110 needs to use the instructions or the data again, the processor 110 may directly invoke the instructions or the data from the memory. Therefore, repeated access is avoided, waiting time of the processor 110 is reduced, and system efficiency is improved.

In some embodiments, the processor 110 may include one or more interfaces. The interface may include an inter-integrated circuit (inter-integrated circuit, I2C) interface, an inter-integrated circuit sound (inter-integrated circuit sound I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170, in some embodiments, the audio module 170 may transmit an audio signal to the wireless communications module 160 through the I2S interface, to implement a function of answering a call through a Bluetooth headset.

The PCM interface may also be configured to: perform audio communication, and sample, quantize, and code an analog signal. In some embodiments, the audio module 170 may be coupled to the wireless communications module 160 through the PCM bus interface. In some embodiments, the audio module 170 may alternatively transmit the audio signal to the wireless communications module 160 through the PCM interface, to implement the function of answering a call through the Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music through the Bluetooth headset.

The MIPI interface may be configured to connect the processor 110 to a peripheral component such as the display 194 or the camera 193. The MIN interface includes a camera serial interface (camera serial interface, CSI), a display serial interface (display serial interface, DSI), and the like. In some embodiments, the processor 110 communicates with the camera 193 through the CSI interface, to implement a shooting function of the electronic device. The processor 110 communicates with the display 194 through the DSI interface, to implement a display function of the electronic device.

The GPIO interface may be configured by using software. The GPIO interface may be configured as a control signal or a data signal. In some embodiments, the GPIO interface may be configured to connect the processor 110 to the camera 193 the display 194, the wireless communications module 160, the audio module 170, the sensor module 180, and the like. The GPIO interface may alternatively be configured as the I2C interface, the I2S interface, the UART interface, the MIPI interface, or the like.

The USB interface 130 is an interface that conforms to a USB standard specification, and may be specifically a mini USB interface, a micro USB interface, a USB Type-C interface, or the like. The USB interface 130 may be configured to connect to a charger to charge the electronic device, or may be configured to transmit data between the electronic device and a peripheral device, or may be configured to be connected to a headset for playing audio through the headset. Alternatively, the interface may be configured to connect to another electronic device such as an AR device.

It may be understood that an interface connection relationship between the modules shown in this embodiment is merely an example for description, and does not constitute a limitation on the structure of the electronic device. In some other embodiments of this application, the electronic device may alternatively use an interface connection manner different from that in the foregoing embodiment, or use a combination of a plurality of interface connection manners.

The charging management module 140 is configured to receive charging input from the charger. The charger may be a wireless charger or a wired charger. In some embodiments of wired charging, the charging management module 140 may receive charging input from the wired charger through the USB interface 130. In some embodiments of wireless charging, the charging management module 140 may receive wireless charging input through a wireless charging coil of the electronic device. The charging management module 140 charges the electronic device by using the power management module 141 while charging the battery 142.

The power management module 141 is configured to connect the battery 142 and the charging management module 140 to the processor 110. The power management module 141 receives input of the battery 142 and/or input of the charging management module 140, and charges the processor 110, the internal memory 121, the display 194, the camera 193, the wireless communications module 160, and the like. The power management module 141 may further be configured to monitor parameters such as a battery capacity, a quantity of battery cycles, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device may be configured to cover one or more communication bands. Different antennas may be further multiplexed to improve antenna utilization. For example, the antenna 1 may be multiplexed as a diversity antenna in a wireless local area network. In some other embodiments, an antenna may be used in combination with a tuning switch.

The mobile communications module 150 may provide a solution that is for wireless communication including 2G/3G/4G/5G and the like and that is used in the electronic device. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules of the mobile communications module 150 may be disposed in the processor 110, in some embodiments, at least some functional modules of the mobile communications module 150 and at least some modules of the processor 110 may be disposed in a same component.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and is then transferred to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same component as the mobile communications module 150 or another function module.

The wireless communications module 160 may provide wireless communication solutions applied to the electronic device, including a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communications module 160 may be one or more components integrated into at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 of the electronic device is coupled to the mobile communications module 150, and the antenna 2 is coupled to the wireless communications module 160, so that the electronic device may communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, (IPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device implements the display function through the GPU, the display 194, the application processor, and the like. The GPU is a microprocessor for image processing, and connects the display 194 to the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode or an active-matrix organic light-emitting diode (active-matrix organic light emitting diode, AMOLED), a flexible light-emitting diode (flex light-emitting diode, FLED), a mini-LED, a micro-LED, a micro-OLED, quantum dot light emitting diodes (quantum dot light emitting diodes, QLED), or the like. In some embodiments, the electronic device may include one or N displays 194, where N is a positive integer greater than 1.

A series of graphical user interfaces (graphical user interface, GUI) may be displayed on the display 194 of the electronic device, and all these GUIs are of home screens of the electronic device. Generally, a size of the display 194 of the electronic device is fixed, and limited controls can be displayed only on the display 194 of the electronic device. A control is a GUI element. The control is a software component included in an application, and controls all data processed by the application and an interaction operation related to the data. A user may interact with the control by performing direct manipulation (direct manipulation), to read or edit related information about the application. Generally, the control may include visual interface elements such as an icon, a button, a menu, a tab, a text box, a dialog box, a status bar, a navigation bar, and a widget. For example, in this embodiment of this application, the display 194 may display a virtual key.

The electronic device may implement the shooting function through the ISP, the camera 193, the video codec, the GPU, the display 194, the application processor, and the like.

The ISP is configured to process data ted back by the camera 193. For example, during photographing, a shutter is pressed, light is transmitted to a photosensitive element of the camera through a lens, and an optical signal is converted into an electrical signal. The photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a shooting scenario. In some embodiments, the ISP may be disposed in the camera 193.

The camera 193 is configured to capture a static image or a video. An optical image of an object is generated by using the lens, and is projected onto the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the electronic device may include one or N cameras 193, where N is a positive integer greater than 1.

The digital signal processor is configured to process a digital signal, and may process other digital signals in addition to the digital image signal. For example, when the electronic device selects a frequency, the digital signal processor is configured to perform Fourier transform and the like on frequency energy.

The video codec is configured to compress or decompress a digital video. The electronic device may support one or more video codecs. In this way, the electronic device can play or record videos in a plurality of encoding formats, for example, a moving picture experts group (moving picture experts group, MPEG) 1, an MPEG 2, an MPEG 3, and an MPEG 4.

The NPU is a neural-network (neural-network, NN) computing processor, quickly processes input information by referring to a structure of a biological neural network, for example, by referring to a transfer mode between human brain neurons, and may further continuously perform self-learning. Applications such as intelligent cognition of the electronic device may be implemented through the NPU, for example, image recognition, facial recognition, speech recognition, and text understanding.

The external memory interface 120 may be configured to connect to an external memory card, for example, a micro SD card, to extend a storage capability of the electronic device. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121 to perform various function applications of the electronic device and data processing. For example, in this embodiment, the processor 110 may deploy the AP by executing the instructions stored in the internal memory 121 and by using the solutions disclosed in the embodiments of this application. The internal memory 121 may include a program storage area and a data storage area. The program storage area may store an operating system, an application required by at least one function (for example, a sound playing function or an image playing function), and the like. The data storage area may store data (such as audio data and a phone book) created when the electronic device is used, and the like. In addition, the internal memory 121 may include a high-speed random access memory, and may further include a nonvolatile memory, for example, at least one magnetic disk storage component, a flash memory component, or a universal flash storage (universal flash storage, UFS). The processor 110 runs the instructions stored in the internal memory 121 and/or the instructions stored in the memory disposed in the processor, to execute various function applications of the electronic device and data processing.

The electronic device may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is further configured to convert analog audio input into a digital audio signal. The audio module 170 may be further configured to code and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The electronic device may listen to music or answer a hands-free call through the speaker 170A.

The receiver 170B, also referred to as an "earpiece", is configured to convert an audio electrical signal into a sound signal. When a call is answered or voice information is received by using the electronic device, the receiver 170B may be put close to a human ear to receive a voice.

The microphone 170C, also referred to as a "mike" or a "microphone", is configured to convert a sound signal into an electrical signal. When making a call or sending voice information, the user may make a sound near the microphone 170C through the mouth of the user, to input a sound signal to the microphone 170C. At least one microphone 170C may be disposed in the electronic device. In some other embodiments, two microphones 170C may be disposed in the electronic device, to implement a noise reduction function, in addition to collecting a sound signal. In some other embodiments, three, four, or more microphones 170C may alternatively be disposed in the electronic device, to collect a sound signal and reduce noise. The microphones may further identify a sound source, to implement a directional recording function, and the like.

The headset jack 170D is configured to connect to a wired headset. The headset jack 170D may be the USB interface 130, a 3.5-mm open mobile electronic device platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are a plurality of types of pressure sensors 180A, for example, a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device determines pressure intensity based on a capacitance change. When a touch operation is performed on the display 194, the electronic device detects intensity of the touch operation by using the pressure sensor 180A. The electronic device may also calculate a touch location based on a detection signal of the pressure sensor 180A. In some embodiments, touch operations that are performed in a same touch location but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on an SMS message application icon, an instruction for creating an SMS message is executed.

The gyro sensor 180B may be configured to determine a motion posture of the electronic device. In some embodiments, angular velocities of the electronic device around three axes (namely, axes x, y, and z) may be determined by using the gyro sensor 180B. The gyro sensor 180B may be configured to implement image stabilization during shooting. For example, when the shutter is pressed, the gyro sensor 180B detects an angle at which the electronic device shakes, and calculates, based on the angle, a distance for which a lens module needs to compensate, so that the lens cancels the shake of the electronic device through reverse motion, to implement image stabilization. The gyro sensor 180B may further be used in navigation and motion-sensing game scenarios.

The barometric pressure sensor 180C is configured to measure barometric pressure. In some embodiments, the electronic device calculates an altitude based on a barometric pressure value measured by the barometric pressure sensor 180C, to assist in positioning and navigation.

The magnetic sensor 180D includes a Hall sensor. The electronic device may detect opening and closing of a flip leather case by using the magnetic sensor 180D. In some embodiments, when the electronic device is a clamshell phone, the electronic device may detect opening and closing of a flip cover by using the magnetic sensor 180D. Further, a feature such as automatic unlocking based on opening of the flip cover is set based on a detected opening or closing state of the leather case or a detected opening or closing state of the flip cover.

The acceleration sensor 180E may detect acceleration values in various directions (usually on three axes) of the electronic device, and may detect a gravity value and a gravity direction when the electronic device is still. The acceleration sensor 180E may further be configured to identify a posture of the electronic device, and is used in an application such as switching between a landscape mode and a portrait mode or a pedometer.

The distance sensor 180E is configured to measure a distance. The electronic device may measure the distance in an infrared or a laser manner. In some embodiments, in a shooting scenario, the electronic device may measure the distance by using the distance sensor 180F, to implement quick focusing.

The optical proximity sensor 180G may include a light-emitting diode (LED) and an optical detector, for example, a photodiode. The light-emitting diode may be an infrared light-emitting diode. The electronic device emits infrared light through the light-emitting diode. The electronic device detects infrared reflected light from a nearby object by using the photodiode. When sufficient reflected light is detected, it may be determined that there is an object near the electronic device. When insufficient reflected light is detected, the electronic device may determine that there is no object near the electronic device. The electronic device may detect, by using the optical proximity sensor 180G, that the user holds the electronic device close to an ear for a call, to automatically turn off a screen for power saving. The optical proximity sensor 180G may also be used in a smart cover mode or a pocket mode to automatically unlock or lock the screen.

The ambient light sensor 180L is configured to sense ambient light brightness. The electronic device may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device is in a pocket, to avoid an accidental touch.

The fingerprint sensor 180H is configured to collect a fingerprint. The electronic device may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device executes a temperature processing policy by using the temperature detected by the temperature sensor 180J. For example, when the temperature reported by the temperature sensor 180J exceeds a threshold, the electronic device degrades performance of a processor near the temperature sensor 180J, to reduce power consumption and implement thermal protection. In some other embodiments, when the temperature is lower than another threshold, the electronic device heats up the battery 142, to avoid abnormal shutdown of the electronic device due to a low temperature. In some other embodiments, when the temperature is lower than still another threshold, the electronic device boosts an output voltage of the battery 142, to avoid abnormal shutdown due to a low temperature.

The touch sensor 180K is also referred to as a "touch component". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. Visual output related to the touch operation may be provided by using the display 194. In some other embodiments, the touch sensor 180K may alternatively be disposed on a surface of the electronic device at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse, to receive a blood pressure beating signal. In some embodiments, the bone conduction sensor 180M may alternatively be disposed in a headset to form a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The key 190 includes a power key, a volume key, and the like. The key 190 may be a mechanical key or a touch key. The electronic device may receive key input, and generate key signal input related to a user setting and function control of the electronic device.

The motor 191 may generate vibration prompting. The motor 191 may be configured to provide incoming call vibration prompting and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted in the SIM card interface 195 or removed from the SIM card interface 195, to implement contact with or separation from the electronic device. The electronic device may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may also be compatible with an external storage card. The electronic device interacts with a network by using the SIM card, to implement functions such as calling and data communication. In some embodiments, an eSIM, namely, an embedded SIM card is used for the electronic device. The eSIM card may be embedded in the electronic device, and cannot be separated from the electronic device.

In addition, an operating system runs on the foregoing components, for example, an iOS operating system developed by Apple, an Android open-source operating system developed by Google, and a Windows operating system developed by Microsoft. An application may be installed and run on the operating system.

Further, embodiments of this application disclose a display method for an electronic device. A display of the electronic device includes a first display area and a second display area.

In an example, the display of the electronic device is a curved screen, and the curved screen includes a first display area with a relatively small curvature and a second display area with a relatively large curvature. The curvature of the first display area is relatively small. Therefore, the first display area is usually used to display an image to be displayed by the electronic device. The curvature of the second display area is relatively large. In order to avoid display image distortion, the second display area is usually used as a touch area to display a touch key, an icon, or the like, or used to notify information such as a missed call.

In another example, the display of the electronic device is in a form of split screens, and different split screens are different display areas.

Certainly, the display of the electronic device may alternatively be in another form. This is not limited in the embodiments of this application.

The following specifically describes the embodiments of this application with reference to the accompanying drawings, to specify the display method for the electronic device disclosed in this application.

Figure 3:
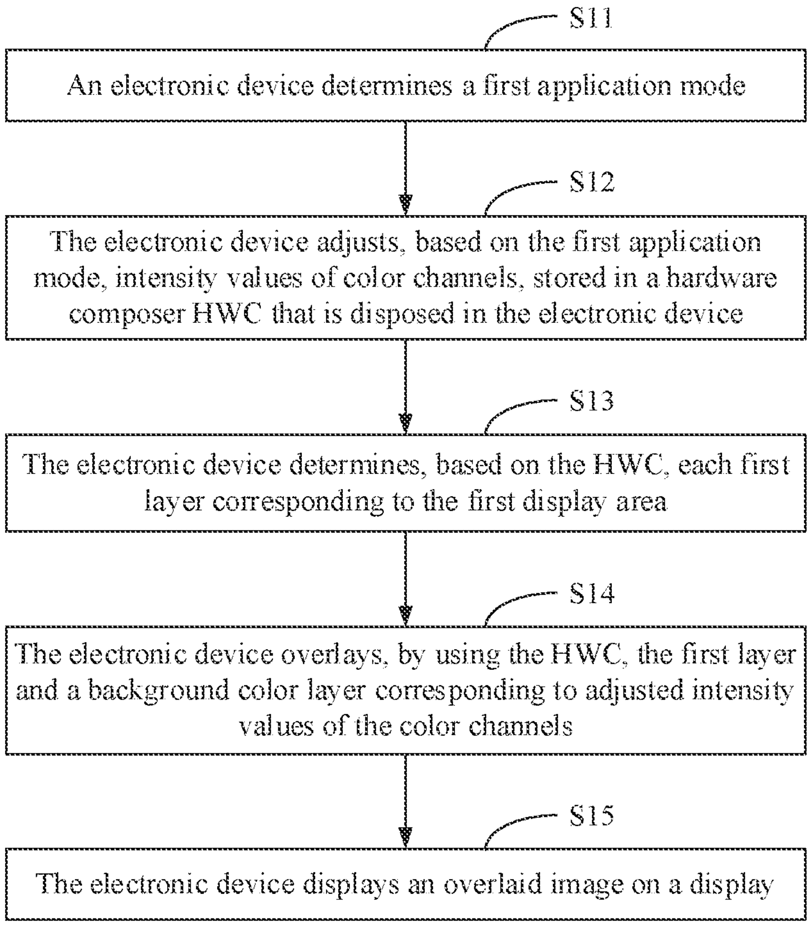
FIG. 3 is a schematic diagram of a working procedure of a display method for an electronic device according to an embodiment of this application.

Referring to a schematic diagram of a working procedure shown in FIG. 3, a display method for an electronic device disclosed in an embodiment of this application includes the following steps.

Step S11: The electronic device determines a first application mode.

There are a plurality of types of application modes for the electronic device. For example, the first application mode may indicate whether the electronic device receives a communication message that is not viewed, the first application mode may indicate whether a battery level of the electronic device is sufficient, or the first application mode may indicate a working status of the electronic device.

Certainly, the first application mode may alternatively be of another type. This is not limited in this embodiment of this application.

Step S12: The electronic device adjusts, based on the first application mode, intensity values of color channels, stored in a hardware composer HWC that is disposed in the electronic device.

In an example, when the electronic device uses an RGB color model, the color channels are three color channels: R (red), G (green), and B (blue). Correspondingly, intensity values of the three color channels each range from 0 to 255.

Certainly, when the electronic device uses another color model, the color channel may also be of another type. This is not limited in this embodiment of this application.

In some embodiments, referring to the schematic diagram of the structure shown in FIG. 2, the electronic device includes a processor 110. The processor 110 includes a display processing unit (display processing unit, DPU) configured to process display-related data, for example, perform color calibration. The DPU may also be referred to as a display subsystem (display subsystem, DSS). The HWC may be disposed in the DPU. A register is disposed in the HWC, and may be configured to store the intensity values of the color channels.

Step S13: The electronic device determines, based on the HWC, each first layer corresponding to the first display area.

Figure 4:
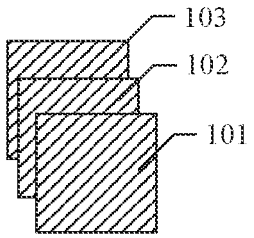
FIG. 4 is a schematic diagram of a layer according to an embodiment of this application.

A layer is an image including elements such as text, or a graph. Layers are overlaid in sequence to form an image. In an example, a schematic diagram of layers is shown in FIG. 4. In FIG. 4, three layers 101, 102, and 103 are included. The three layers may include elements such as text or graphs. After the three layers are overlaid, an image is formed.

In this embodiment of this application, a layer corresponding to the first display area is referred to as a first layer. The HWC may read related data of the first layer corresponding to the first display area by using a memory, and determine the first layer based on the related data.

S14: The electronic device overlays, by using the HWC, the first layer and a background color layer corresponding to adjusted intensity values of the color channels, where in an overlay process, the background color layer is located below the first layer.

The background color layer is a layer corresponding to the second display area.

In this embodiment of this application, the first display area and the second display area display different images. In this case, the layer corresponding to the second display area is determined by using the intensity values of the color channels, stored in the HWC, and content of the layer corresponding to the second display area is adjusted by adjusting the intensity values of the color channels, stored in the HWC.

Figure 5A:
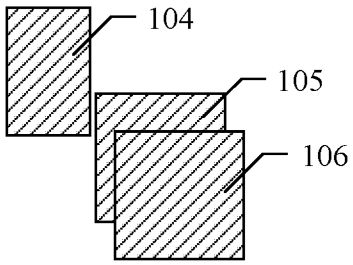
FIG. 5(*a*) is a schematic diagram of a background color layer and first layers according to an embodiment of this application.
Figure 5B:
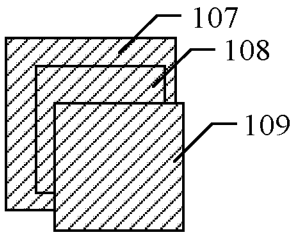

In addition, the first display area and the second display area are located in different areas on a display. In an example, there is no overlapping area between the background color layer and the first layer. A schematic diagram may be shown in FIG. 5(*a*). In FIG. 5(*a*), a background color layer 104, a first layer 105, and a first layer 106 are included. After overlay, the second display area is used to display content of the background color layer 104, and the first display area is used to display content obtained after the first layer 105 and the first layer 106 are overlaid.

In another example, in an example, a schematic diagram of a background color layer and first layers may be shown in FIG. 5(*b*). In FIG. 5(*b*), the background color layer 107, a first layer 108, and a first layer 109 are included. The first layer 108 and the first layer 109 are located right above the background color layer 107, and an area of the background color layer 107 is greater than either of an area of the first layer 108 and an area of the first layer 109. In this case, after overlay, the first layer 108 and the first layer 109 cover some areas of the background color layer 107. An area that is of the background color layer 107 and that is not covered by the first layer 108 and the first layer 109 is an area corresponding to the second display area. The second display area is used to display content of the background color layer 107, and the first display area is used to display content obtained after the background color layer 107, the first layer 108, and the first layer 109 are overlaid.

Figure 1A:
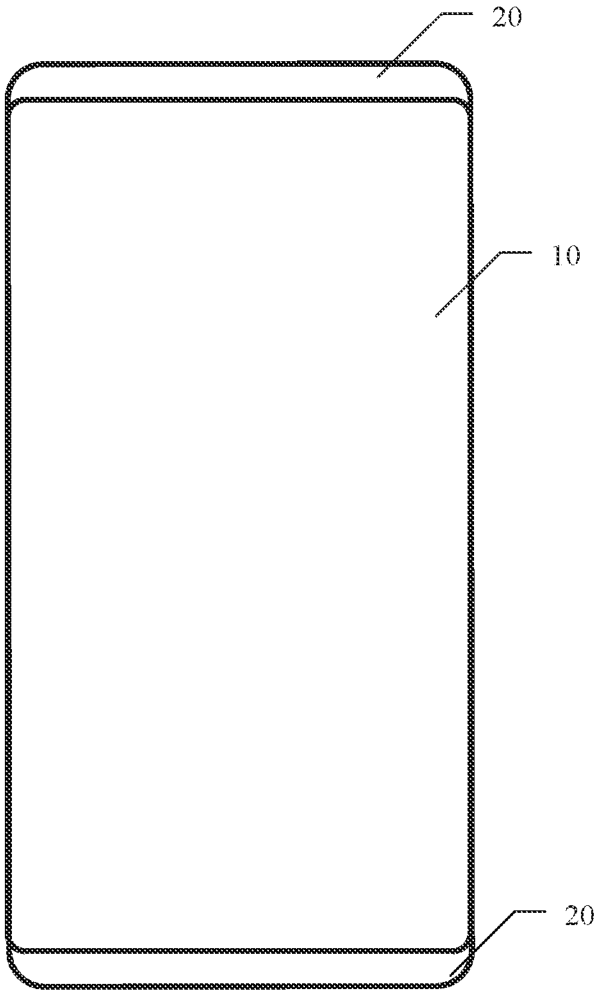
FIG. 1(*a*) is a schematic diagram of a display of an electronic device according to the conventional technology.
Figure 1B:
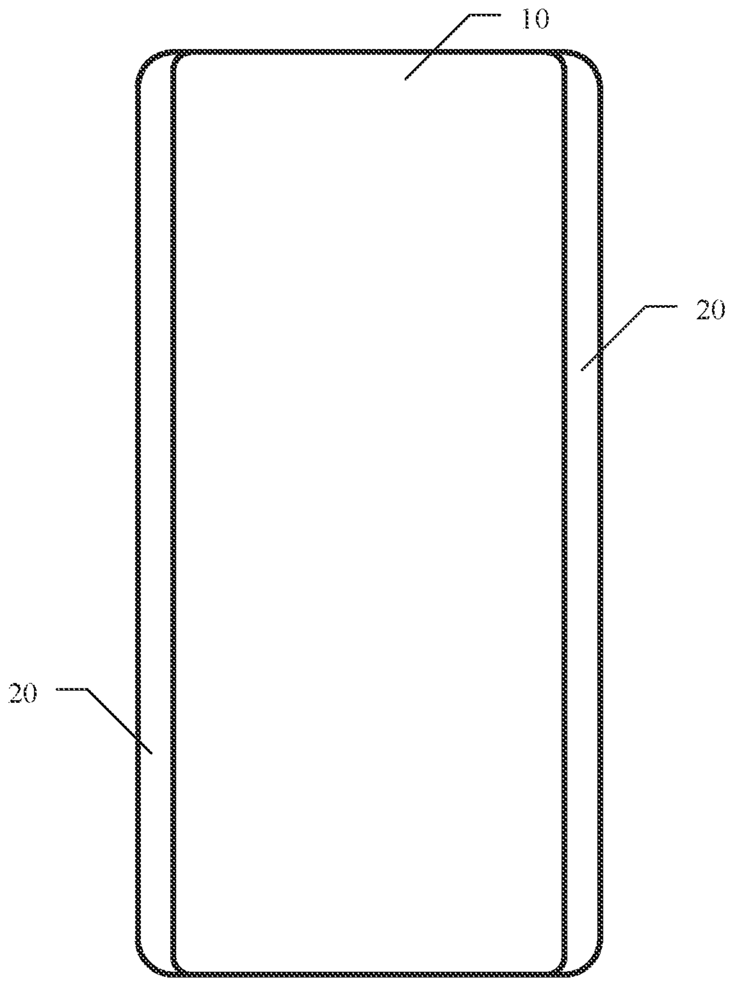
Figure 1C:
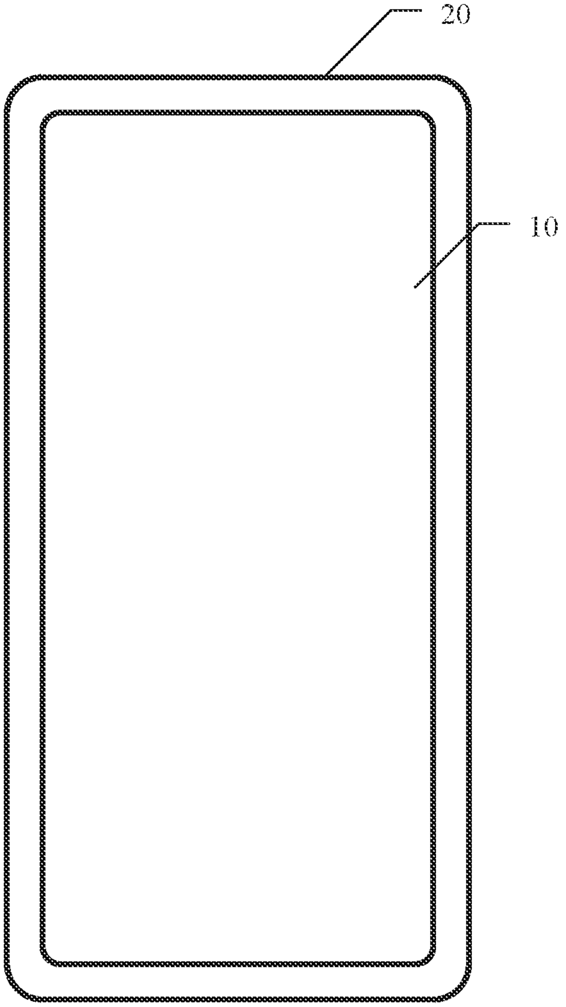

When the display of the electronic device is a curved screen, and as shown in FIG. 1(*a*) to FIG. 1(*c*), when the curved screen includes the first display area with a relatively small curvature and the second display area with a relatively large curvature, the background color layer may be a layer corresponding to the entire display, that is, covering an entire area of the display. The first layer is the layer in the second display area. The layer in the first display area is overlaid after the background color layer. In this case, in an obtained overlaid image, the image displayed in the first display area is content obtained after the background color layer, the first layer, and the first layer are overlaid, and content of the background color layer is displayed in the second display area.

Step S15: The electronic device displays the overlaid image on the display.

Compared with that in a first method in the conventional technology, in the method in this embodiment of this application, the first layer corresponding to the first display area is determined by using the HWC, and the background color layer is determined by adjusting the intensity values of the color channels, stored in the HWC. The HWC does not need to generate all layers. Therefore, this reduces a quantity of layers generated by the HWC, and avoids a problem that an image that needs to be displayed on the display cannot be determined due to a limitation of the HWC. In addition, compared with that in a second method in the conventional technology, a GPU does not need to exchange data with a memory for a plurality of times. Power consumption is reduced.

Figure 6:
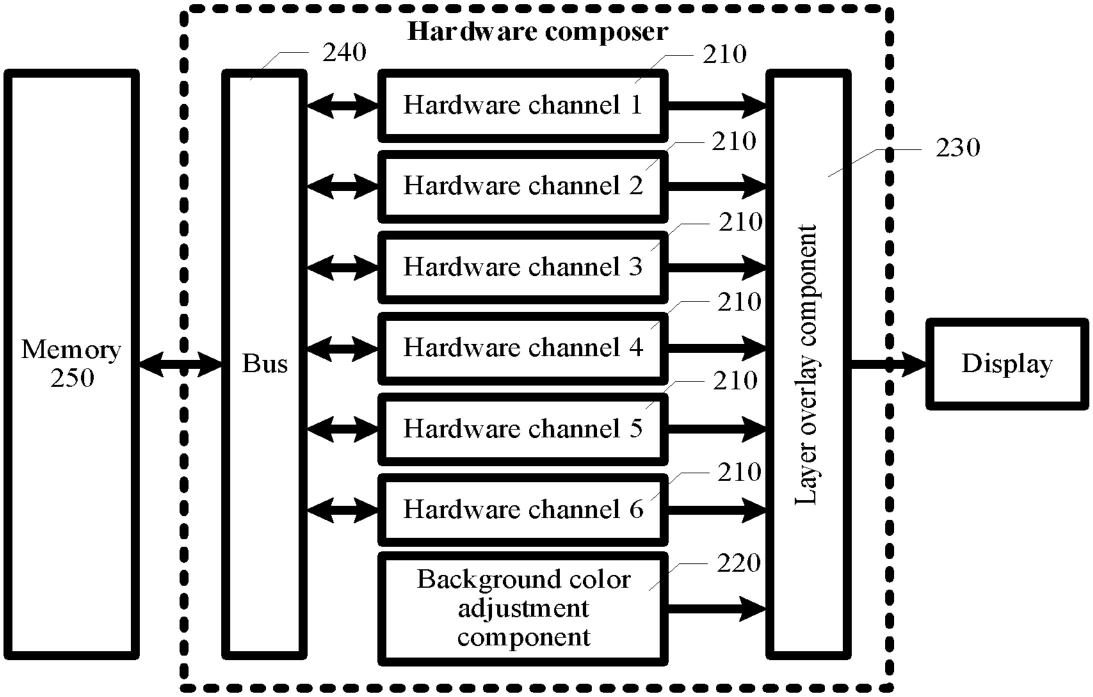
FIG. 6 is a schematic diagram of a structure of a hardware composer according to an embodiment of this application.

Further, to specify a method for obtaining an overlaid image in this application, an embodiment of this application discloses a schematic diagram of a structure of an HWC shown in FIG. 6.

Referring to FIG. 6, the HWC generally includes a plurality of hardware channels 210, a background color adjustment component 220, a layer overlay component 230, and a bus 240.

One end of each of the plurality of hardware channels 210 is connected to a memory 250 of an electronic device through the bus 240, and the other end of each of the plurality of hardware channels 210 is connected to the layer overlay component 230. The background color adjustment component 220 is connected to the layer overlay component 230.

The background color adjustment component 220 is configured to store intensity values of color channels.

The hardware channel 210 is configured to determine a layer corresponding to the hardware channel 210. In the conventional technology, a first display area and a second display area are divided into a plurality of layers. Each hardware channel 210 corresponds to one layer in the first display area or one layer in the second display area, and is configured to read, from the memory, data of the layer corresponding to the hardware channel 210, determine the corresponding layer based on the data, and transmit the determined layer to the layer overlay component 230.

In addition, in the conventional technology, the background color adjustment component 220 in the HAW is configured to determine a background color of an image that needs to be displayed on a display, and the layer overlay component 230 determines a background color layer based on the intensity values of the color channels, stored in the background color adjustment component 220.

In this case, the layer overlay component 230 is configured to perform overlay processing on the background color layer and layers that correspond to the first display area and the second display area and that are transmitted by each hardware channel 210, and push an obtained image to the display, so that the display obtains and displays the overlaid image.

In the conventional technology, in an overlay process of the layer overlay component 230, a layer corresponding to a first display area and a layer corresponding to a second display area are located above a background color layer determined by the background color adjustment component. In the overlay process, the background color layer corresponding to the intensity values of the color channels, stored in the background color adjustment component is placed at a bottom layer. The layers above the background color layer are the layer corresponding to the first display area and the layer corresponding to the second display area, and the background color layer is covered.

In this case, the intensity values of the color channels, stored in the background color adjustment component do not affect an image displayed on a display. Therefore, the stored intensity values of the color channels always remain unchanged. For example, intensity values of three color channels R, G and B stored in the background color adjustment component are always 0.

However, in the conventional technology, each hardware channel needs to generate one layer, and a quantity of hardware channels in the HWC is usually limited. Therefore, when there are a relatively large quantity of layers that correspond to the first display area and the second display area, the quantity of hardware channels is usually insufficient. As a result, the image that needs to be displayed on the display cannot be obtained.

However, in this embodiment of this application, the layer overlay component 230 in the HWC is separately connected to the hardware channel 210 and the background color adjustment component 220. Each hardware channel 210 in the HWC reads data that is of each layer corresponding to a first display area and that is in the memory, to determine the first layer corresponding to the first display area. In addition, an electronic device may adjust, based on a first application mode, the intensity values of the color channels, stored in the background color adjustment component 220 in the HWC. Then, the layer overlay component 230 overlays each first layer and a background color layer corresponding to adjusted intensity values of the color channels. In an overlay process, the background color layer is located below the first layer. In this case, content of the background color layer is content displayed in a second display area.

For example, when the background color layer corresponding to the adjusted intensity values of the color channels is red, because in the overlay process, the background color layer is below the first layer, and an upper layer of the background color layer is the first layer corresponding to the first display area, in an obtained overlaid image, the second display area in the display presents a color of the background color layer, that is, the second display area presents red, and the first display area displays content obtained after the background color layer and each first layer are overlaid.

In other words, in this embodiment of this application, the built-in background color adjustment component in the HWC is used to determine content displayed in the second display area, and the hardware channel in the HWC does not need to determine the layer corresponding to the second display area. The hardware channels are less occupied, and problems of insufficient hardware channels are avoided. Therefore, a problem in a first method in the conventional technology is resolved. In addition, a GPU does not need to exchange data with the memory for a plurality of times. Power consumption is reduced, and a problem in a second method in the conventional technology is resolved.

In addition, in this embodiment of this application, an operation of adjusting by the electronic device based on the first application mode, the intensity values of the color channels, stored in the hardware composer HWC of the electronic device is disclosed. In different application modes, the electronic device may adjust, in different manners, the intensity values of the color channels, stored in the background color adjustment component.

In an example, when the first application mode indicates that a battery level of the electronic device is greater than a first threshold, that the electronic device adjusts, based on the first application mode, the intensity values of the color channels stored in the hardware composer HWC of the electronic device includes:

When the first application mode indicates that the battery level of the electronic device is greater than the first threshold, the electronic device adjusts, based on an adjustment interval and a variation that correspond to each color channel, the intensity values of the color channels, stored in the HWC.

A difference between an adjusted intensity value of a color channel and an unadjusted intensity value of the color channel is the variation.

When the battery level of the electronic device is greater than the first threshold, it indicates that the battery level of the electronic device is sufficient. In this case, the second display area may display different colors at each adjustment interval, so as to prompt a user, or play a role of beautification.

In an adjustment process, the intensity values of the color channels, in the background color adjustment component may be adjusted once at each adjustment interval, and each time during the adjustment, the variation corresponding to the color channels is increased on the basis of an unadjusted intensity value of the color channel. For example, a variation of a color channel R may be 5. If an unadjusted intensity value of the color channel R is 30, an intensity value of the color channel R is adjusted to 35 after the first adjustment.

Further, in the foregoing method, after the intensity values are adjusted to a color threshold, the intensity values may be further adjusted to an initial value. The initial value is an intensity value corresponding to each color channel before the intensity values of the color channels are adjusted for the first time. For example, if intensity values of three color channels R, G, and B are 255 at most, it may be determined that the preset threshold is 255. In this case, when an intensity value of a color channel is adjusted to 255, the intensity values of the color channels are adjusted back to an initial value.

Further, in this embodiment of this application, the second display area may be used to implement message prompting. In this case, that the electronic device adjusts, based on the first application mode, the intensity values of the color channels, stored in the hardware composer HWC of the electronic device includes:

When the first application mode indicates that the electronic device receives a communication message, and the communication message is not viewed, the electronic device determines an adjustment period. The adjustment period includes at least two time periods.

The communication message may include an SMS message, incoming call information, email information, information about an instant messaging application, or the like. For example, the communication message may include WeChat information, or the like.

The electronic device periodically adjusts, based on intensity values of the color channel, corresponding to each time period, the intensity values of the color channels, stored in the HWC.

In this embodiment of this application, each adjustment period is set to include the at least two time periods, and intensity values of the color channels, corresponding to each time period are preset. Therefore, in different time periods of one adjustment period, intensity values of color channels stored in the background color adjustment component are different. In this case, an image that is in the second display area and that is determined based on the intensity values of the color channels, stored in the background color adjustment component presents a periodic change.

In addition, in different time periods in each adjustment period, images in the second display area are different, to implement the message prompting.

In an example, intensity values of color channels corresponding to the at least two time periods in the adjustment period change from strong to weak. In this case, a color of the image displayed in the second display area periodically changes from strong to weak.

When the first application mode indicates that the communication message is viewed, the electronic device adjusts, the intensity values of the color channels, stored in the HWC to the initial value. The initial value is an intensity value of the color channel stored in the HWC before the electronic device receives the communication message.

According to the solution in this embodiment of this application, when the electronic device receives the communication message and the communication message is not viewed, the intensity values of the color channels, in the HWC are adjusted based on the intensity value of the color channels corresponding to each time period in the adjustment period, so as to prompt the user.

When the first application mode indicates that the communication message is viewed, there is no need to prompt the user. In this case, the intensity values of the color channels, in the HWC may be adjusted to the initial value.

In another example, in a process of playing audio, the electronic device may further adjust, based on the audio, the intensity values of the color channels, stored in the HWC. In this case, that the electronic device adjusts, based on the first application mode, the intensity values of the color channels, stored in the HWC includes:

When the first application mode indicates that the electronic device plays the audio, the electronic device obtains a frequency and/or an amplitude of the audio.

The electronic device adjusts, based on a correspondence between the frequency of the audio and a first color channel, an intensity value of the first color channel stored in the HWC, and/or the electronic device adjusts, based on a correspondence between the amplitude of the audio and a second color channel, an intensity value of the second color channel stored in the HWC.

In this embodiment of this application, correspondences between different frequencies of the audio and first color channel are set. In a process of playing the audio, the intensity value of the first color channel may be adjusted based on the correspondence and the frequency of the currently played audio. In addition, correspondences between different amplitudes of the audio and second color channel may be further set. In the process of playing the audio, the intensity value of the second color channel may be adjusted based on the correspondence and the amplitude of the currently played audio.

According to this embodiment of this application, the second display area of the electronic device can present different colors based on the played audio. For example, when playing a song, the electronic device may correspondingly adjust, based on a frequency and/or an amplitude of the played song the intensity values of the color channels, stored in the HWC, so as to adjust content displayed in the second display area.

In another example, that the electronic device adjusts, based on the first application mode, the intensity values of the color channels, stored in the HWC includes:

When the first application mode indicates that the electronic device performs a photographing operation, the electronic device adjusts the intensity values of the color channels, stored in the HWC to a first intensity value.

In this case, the first intensity value may be an intensity value of the color channel in a highlight case, so that when the electronic device performs the photographing operation, the second display area can present a highlighted color, to play a role of light compensation.

Further, in this embodiment of this application, the HWC includes a register.

When pixels in the second display area of the curved screen display a same color, the register is configured to store the intensity value of each color channel.

That pixels in the second display area of the curved surface screen display a same color means that colors in the second display area are displayed as a single color. In this case, the register included in the background color adjustment component is configured to store the intensity values of each color channel. For example, the register may store intensity values of different color channels by using different fields, or each color channel corresponds to one register. The register corresponding to the color channel stores the intensity value of the color channel.

When different areas in the second display area of the curved screen display different colors, the register is configured to store intensity values of each color channel corresponding to the different areas.

In this embodiment of this application, the second display area may be further divided into different areas, and each area displays a different color. In this case, the register included in the HWC is configured to store the intensity values of the color channel corresponding to the different areas. For example, the register may store, by using different fields, the intensity values of each color channel corresponding to the different regions. Alternatively, there are a plurality of registers, and each register is configured to store an intensity value of a color channel corresponding to a specific area in the second display area.

In addition, when the HWC stores the intensity value of each color channel by using the background color adjustment component, the register is disposed in the background color adjustment component.

Apparatus embodiments of the present invention are provided in the Mowing, and may be used to execute the method embodiments of the present invention. For details that are not disclosed in the apparatus embodiments of the present invention, refer to the method embodiments of the present invention.

Figure 7:
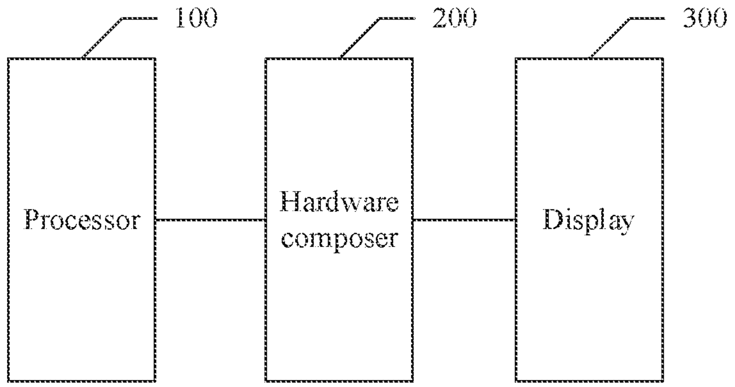
FIG. 7 is a schematic diagram of a structure of another electronic device according to an embodiment of this application.

An embodiment of this application discloses an electronic device. Referring to a schematic diagram of a structure shown in FIG. 7, the electronic device includes a processor 100, a hardware composer HWC 200, and a display 300.

The display 300 includes a first display area and a second display area.

The processor 100 is configured to determine a first application mode, and adjust, based on the first application mode, intensity values of color channels, stored in the hardware composer HWC that is disposed in the electronic device;

The HWC 200 is configured to determine each first layer corresponding to the first display area, and overlay the first layer and a background color layer corresponding to adjusted intensity values of the color channels. In an overlay process, the background color layer is located below the first layer, and the background color layer is a layer corresponding to the second display area.

The display 300 is configured to display an overlaid image.

Further, in the electronic device disclosed in this embodiment of this application, that the processor adjusts, based on the first application mode, the intensity values of the color channels, stored in the hardware composer HWC that is disposed in the electronic device includes:

When the first application mode indicates that a battery level of the electronic device is greater than a first threshold, the processor adjusts, based on an adjustment interval and a variation that correspond to each color channel, the intensity values of the color channels, stored in the HWC.

A difference between an adjusted intensity value of the color channel and an unadjusted intensity value of the color channel is the variation.

Further, in the electronic device disclosed in this embodiment of this application, that the processor adjusts, based on the first application mode, the intensity values of the color channels, stored in the hardware composer HWC that is disposed in the electronic device includes:

When the first application mode indicates that the electronic device receives a communication message, and the communication message is not viewed, the processor determines an adjustment period. The adjustment period includes at least two time periods.

The processor periodically adjusts, based on intensity values of the color channel, corresponding to each time period, the intensity values of the color channels, stored in the HWC.

When the first application mode indicates that the communication message is viewed, the processor adjusts the intensity values of the color channels, stored in the HWC to an initial value. The initial value is an intensity value of the color channel stored in the HWC before the electronic device receives the communication message.

Further, in the electronic device disclosed in this embodiment of this application, that the processor adjusts, based on the first application mode, the intensity values of the color channels, stored in the hardware composer HWC that is disposed in the electronic device includes:

When the first application mode indicates that the electronic device plays audio, the processor obtains a frequency and/or an amplitude of the audio.

The processor adjusts, based on a correspondence between the frequency of the audio and a first color channel, an intensity value of the first color channel stored in the HWC, and/or the electronic device adjusts, based on a correspondence between the amplitude of the audio and a second color channel, an intensity value of the second color channel stored in the HWC.

Further, in the electronic device disclosed in this embodiment of this application, that the processor adjusts, based on the first application mode, the intensity values of the color channels, stored in the hardware composer HWC that is disposed in the electronic device includes:

When the first application mode indicates that the electronic device performs a photographing operation, the processor adjusts the intensity values of the color channels, stored in the HWC to a first intensity value.

Further, in the electronic device disclosed in this embodiment of this application, the HWC includes a register.

When pixels in the second display area display a same color, the register is configured to store an intensity value of each color channel.

When different areas in the second display area display different colors, the register is configured to store intensity values of each color channel corresponding to the different areas.

In specific implementation, an embodiment of this application further provides a computer-readable storage medium. The computer-readable storage medium includes instructions. When the computer-readable medium disposed in any device runs on a computer, all or some of the steps in the embodiments corresponding to FIG. 2, and FIG. 3 may be implemented. The storage medium of the computer-readable medium may include: a magnetic disk, an optical disc, a read-only memory (read-only memory, ROM for short), or a random access memory (random access memory, RAM for short), and the like.

In addition, another embodiment of this application further discloses a computer program product including an instruction. When the computer program product runs on an electronic device, the electronic device is enabled to perform all or some of the steps in the embodiment corresponding to FIG. 3.

The various illustrative logical units and circuits described in the embodiments of this application may implement or operate the described functions by using a general purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general purpose processor may be a microprocessor. Optionally, the general purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor, so that the processor may read information from the storage medium and write information to the storage medium. Alternatively, the storage medium may further be integrated into a processor. The processor and the storage medium may be arranged in an ASIC, and the ASIC may be arranged in UE. Optionally, the processor and the storage medium may be arranged in different components of the UE.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

All parts in this specification are all described in a progressive manner, for same or similar parts in the embodiments, refer to these embodiments, and each embodiment focuses on a difference from other embodiments. Especially, apparatus and system embodiments are basically similar to a method embodiment, and therefore are described briefly; for related parts, refer to partial descriptions in the method embodiment.

Although some preferred embodiments of this application have been described, a person skilled in the art can make changes and modifications to these embodiments once learning the basic inventive concept. Therefore, the following claims are intended to be construed as to cover the preferred embodiments and all changes and modifications falling within the scope of this application.

A person skilled in the art may clearly understand that, the technologies in the embodiments of the present invention may be implemented by software in addition to a necessary general hardware platform. Based on such an understanding, the technical solutions in the embodiments of the present invention essentially, or the part contributing to the conventional technology may be implemented in the form of a software product. The computer software product may be stored in a storage medium, such as a ROM/RAM, a magnetic disk, or an optical disc, and includes several instructions for instructing a computer device (which may be a personal computer, a server, or a network device) to perform the methods described in the embodiments or some parts of the embodiments of the present invention.

For same or similar parts in the embodiments in this specification, refer to each other. Especially, the apparatus embodiment is basically similar to a method embodiment, and therefore is described briefly; for related parts, refer to descriptions in the method embodiment.

The foregoing descriptions are implementations of the present invention, but are not intended to limit the protection scope of the present invention.

What is claimed is:

1. A method implemented by an electronic device, wherein the method comprises:

determining a first application mode;

adjusting, based on the first application mode, first intensity values of first color channels stored in a hardware composer (HWC) disposed in the electronic device to obtain adjusted intensity values of the first color channels;

determining, using the HWC, a first layer corresponding to a first display area of a display of the electronic device;

overlaying, using the HWC, the first layer and a background color layer corresponding to the adjusted intensity values to obtain an overlaid image, wherein the background color layer is located below the first layer in an overlay process, and wherein the background color layer corresponds to a second display area of the display; and displaying the overlaid image on the display.

2. The method of claim 1, further comprising:

identifying that the first application mode indicates that a battery level of the electronic device is greater than a first threshold; and further adjusting, in response to identifying that the battery level is greater than the first threshold and based on an adjustment interval and a variation corresponding to each of the first color channels, the first intensity values to obtain the adjusted intensity values, wherein the variation comprises a difference between an adjusted intensity value of a corresponding color channel and an unadjusted intensity value of the corresponding color channel.

3. The method of claim 1, further comprising:

when the first application mode indicates that the electronic device has received a communication message and the communication message has not been viewed:

determining an adjustment period comprising at least two time periods; and periodically adjusting, based on second intensity values of a second color channel corresponding to each of the at least two time periods, the first intensity values; and further adjusting the first intensity values to an initial value when the first application mode indicates that the communication message is viewed, wherein the initial value is a third intensity value of a third color channel stored in the HWC before the electronic device receives the communication message.

4. The method of claim 1, further comprising:

identifying that the first application mode indicates that the electronic device is configured to play an audio signal;

obtaining, in response to identifying that the electronic device is configured to play the audio signal, a frequency of the audio signal; and adjusting, based on a correspondence between the frequency and a second color channel stored in the HWC, a second intensity value of the second color channel.

5. The method according to of claim 1, further comprising:

identifying that the first application mode indicates that the electronic device is configured to perform a photographing operation; and adjusting, in response to identifying that the electronic device is configured to perform the photographing operation, the first intensity values to a second intensity value.

6. The method of claim 1, wherein the HWC comprises a register, and wherein the method further comprises:

storing, using the register, a second intensity value of each of the first color channels when pixels in the second display area display a same color; and storing, using the register, third intensity values of each of the first color channels corresponding to different areas in the second display area when the different areas display different colors.

7. The method of claim 1, further comprising:
identifying that the first application mode indicates that the electronic device is configured to play an audio signal;
obtaining, in response to identifying that the electronic device is configured to play the audio signal, an amplitude of the audio signal; and
adjusting, based on a correspondence between the amplitude and a second color channel stored in the HWC, a second intensity value of the second color channel.

8. An electronic device comprising:
a display comprising:
a first display area; and
a second display area;
a processor coupled to the display and configured to:
determine a first application mode; and
adjust, based on the first application mode, first intensity values of first color channels to obtain adjusted intensity values of the first color channels; and
a hardware composer (HWC) coupled to the processor and the display and configured to:
store the first intensity values;
determine a first layer corresponding to the first display area; and
overlay the first layer and a background color layer corresponding to the adjusted intensity values to obtain an overlaid image, wherein the background color layer is located below the first layer in an overlay process, and wherein the background color layer corresponds to the second display area, and
wherein the display is configured to display the overlaid image.

9. The electronic device of claim 8, wherein the processor is further configured to:
identify that the first application mode indicates that a battery level of the electronic device is greater than a first threshold; and
adjust, in response to identifying that the battery level is greater than the first threshold and based on an adjustment interval and a variation corresponding to each of the first color channels, the first intensity values to obtain the adjusted intensity values, wherein the variation comprises a difference between an adjusted intensity value of a corresponding color channel and an unadjusted intensity value of the corresponding color channel.

10. The electronic device of claim 8, wherein the processor further configured to:
when the first application mode indicates that the electronic device has received a communication message and the communication message has not been viewed:
determine an adjustment period comprising at least two time periods; and
periodically adjust, based on second intensity values of a second color channel corresponding to each of the at least two time periods, the first intensity values; and
further adjust the first intensity values to an initial value when the first application mode indicates that the communication message is viewed, wherein the initial value is a third intensity value of a third color channel stored in the HWC before the electronic device receives the communication message.

11. The electronic device of claim 8, wherein the processor further configured to:
identify that the first application mode indicates that the electronic device is configured to play an audio signal;
obtain, in response to identifying that the electronic device is configured to play the audio signal, a frequency of the audio signal; and
adjust, based on a correspondence between the frequency and a second color channel stored in the HWC, a second intensity value of the second color channel.

12. The electronic device of claim 8, wherein the processor further configured to:
identify that the first application mode indicates that the electronic device is configured to perform a photographing operation; and
adjust, in response to identifying that the electronic device is configured to perform the photographing operation, the first intensity values to a second intensity value.

13. The electronic device of claim 8, wherein the HWC comprises a register configured to:
store a second intensity value of each of the first color channels when pixels in the second display area display a same color; and
store third intensity values of each of the first color channels corresponding to different areas in the second display area when the different areas display different colors.

14. The electronic device of claim 8, wherein the processor is further configured to:
identify that the first application mode indicates that the electronic device is configured to play an audio signal;
obtain, in response to identifying that the electronic device is configured to play the audio signal, an amplitude of the audio signal; and
adjust, based on a correspondence between the amplitude and a second color channel stored in the HWC, a second intensity value of the second color channel.

15. A computer program product comprising computer-executable instructions that are stored on a non-transitory computer-readable medium and that, when executed by a processor, cause an electronic device to:
determine a first application mode;
adjust, based on the first application mode, first intensity values of first color channels stored in a hardware composer (HWC) disposed in the electronic device to obtain adjusted intensity values of the first color channels;
determine, using on the HWC, a first layer corresponding to a first display area of a display of the electronic device;
overlay, using the HWC, the first layer and a background color layer corresponding to the adjusted intensity values to obtain an overlaid image, wherein the background color layer is located below the first layer in an overlay process, and wherein the background color layer corresponds to a second display area of the display; and
display the overlaid image on the display.

16. The computer program product of claim 15, wherein the computer-executable instructions further cause the electronic device to:
identify that the first application mode indicates that a battery level of the electronic device is greater than a first threshold; and
further adjust, in response to identifying that the battery level is greater than the first threshold and based on an adjustment interval and a variation corresponding to each of the first color channels, the first intensity values to obtain the adjusted intensity values, wherein the variation comprises a difference between an adjusted intensity value of a corresponding color channel and an unadjusted intensity value of the corresponding color channel.

17. The computer program product of claim 15, wherein the computer-executable instructions further cause the electronic device to:

when the first application mode indicates that the electronic device has received a communication message and the communication message has not been viewed:

determine an adjustment period comprising at least two time periods; and periodically adjust, based on second intensity values of a second color channel corresponding to each of the at least two time periods, the first intensity values; and further adjust the first intensity values to an initial value when the first application mode indicates that the communication message is viewed, wherein the initial value is a third intensity value of a third color channel stored in the HWC before the electronic device receives the communication message.

18. The computer program product of claim 15, wherein the computer-executable instructions further cause the electronic device to:

identify that the first application mode indicates that the electronic device is configured to play an audio signal;

obtain, in response to identifying that the electronic device is configured to play the audio signal, a frequency of the audio signal or an amplitude of the audio signal; and adjust, based on a first correspondence between the frequency and a second color channel stored in the HWC, a second intensity value of the second color channel or adjust, based on a second correspondence between the amplitude and a third color channel stored in the HWC, a third intensity value of the third color channel.

19. The computer program product of claim 15, wherein the computer-executable instructions further cause the electronic device to:

identify that the first application mode indicates that the electronic device is configured to perform a photographing operation; and adjust, in response to identifying that the electronic device is configured to perform the photographing operation, the first intensity values to a second intensity value.

20. The computer program product of claim 15, wherein the HWC comprises a register, and wherein the computer-executable instructions further cause the electronic device to:

store, using the register, a second intensity value of each of the first color channels when pixels in the second display area display a same color; and store, using the register, third intensity values of each of the first color channels corresponding to different areas in the second display area when the different areas display different colors.

* * * * *